United States Patent [19]

Weatherby

[11] Patent Number: 4,673,073
[45] Date of Patent: Jun. 16, 1987

[54] CENTRIFUGAL SPRING CLUTCH

[75] Inventor: John H. Weatherby, Pitman, N.J.

[73] Assignee: Warner Electric Brake & Clutch Company, South Beloit, Ill.

[21] Appl. No.: 762,690

[22] Filed: Aug. 5, 1985

Related U.S. Application Data

[63] Continuation-in-part of Ser. No. 628,205, Jul. 5, 1984, abandoned.

[51] Int. Cl.⁴ .................. F16D 13/08; F16D 43/18
[52] U.S. Cl. .................. 192/35; 192/81 C; 192/93 R; 192/103 B; 192/104 C; 192/105 BA
[58] Field of Search .......... 192/35, 81 C, 89 A, 192/93 R, 103 B, 104 C, 105 A, 105 BA

[56] References Cited

U.S. PATENT DOCUMENTS

| | | | |
|---|---|---|---|
| 1,917,484 | 7/1933 | Banker | 192/105 BA |
| 1,972,915 | 9/1934 | Barton | 192/35 |
| 3,262,533 | 7/1966 | Keller et al. | 192/105 BA |
| 3,625,326 | 12/1971 | Rix et al. | 192/105 CE |
| 3,648,810 | 3/1972 | Weatherby | 192/26 |
| 3,724,622 | 4/1973 | Barbulesco et al. | 192/105 CE |
| 3,727,738 | 4/1973 | Briar | 192/105 CE |
| 3,915,268 | 10/1975 | MacDonald | 192/12 BA |
| 4,321,992 | 3/1982 | Gallo | 192/81 C |
| 4,440,280 | 4/1984 | Hagihara | 192/36 |
| 4,494,637 | 1/1985 | Gotoda et al. | 192/48.4 |

Primary Examiner—Rodney H. Bonck
Assistant Examiner—Richard M. Lorence
Attorney, Agent, or Firm—Leydig, Voit & Mayer

[57] ABSTRACT

A normally engaged wrap spring clutch includes a helical spring which normally is wrapped down on the outer surfaces of aligned input and output hubs to couple the latter. One end of the spring is anchored on the input hub and the other end is secured to a control collar which is telescoped over the spring so that, by turning the control collar relative to the input hub, the spring is unwrapped from the surfaces of the hubs to disengage the clutch. Pins project longitudinally into radial slots in the input hub and spiral slots in the control collar and have substantial mass so that, when the input hub reaches a preselected speed, the pins move radially outward under centrifugal force and, through a camming action in the spiral grooves, turn the control collar relative to the input hub thereby unwrapping the spring. In an alternative embodiment, the outwardly moving pins turn the control collar to cause the spring to wrap down and cause engagement of a normally disengaged clutch.

10 Claims, 8 Drawing Figures

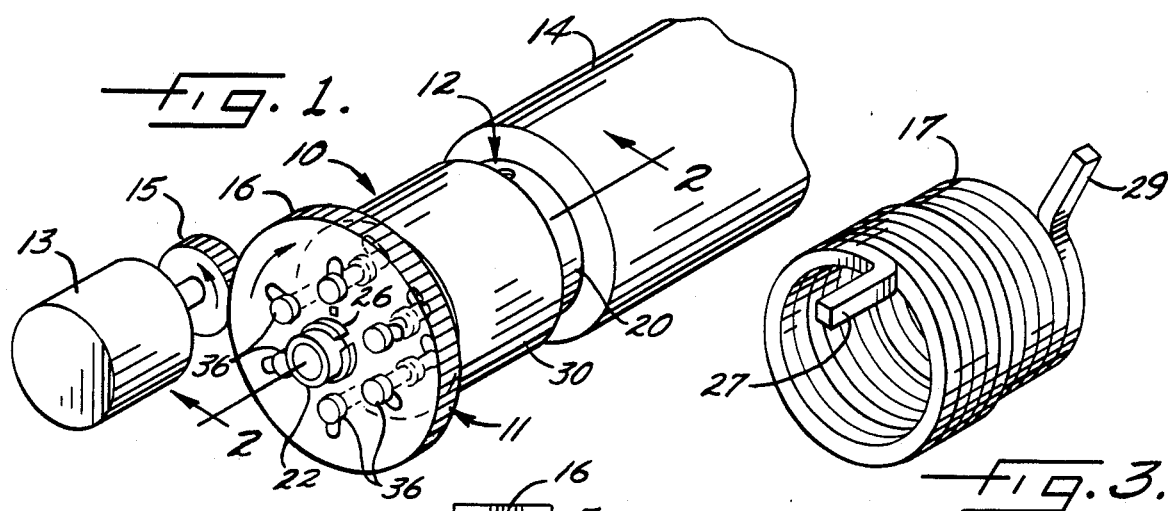
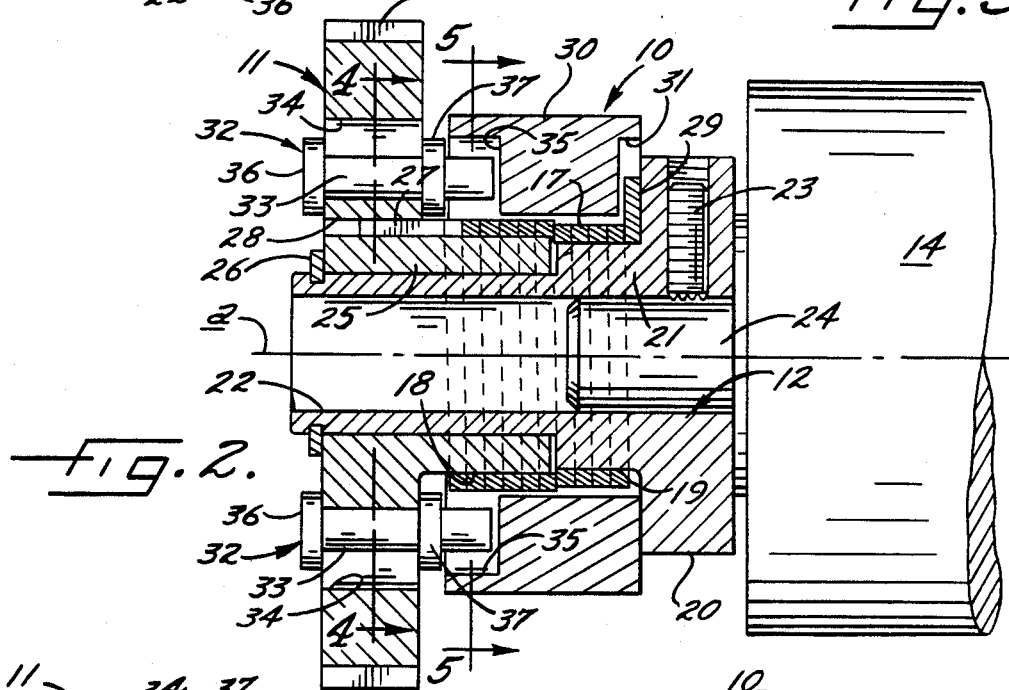
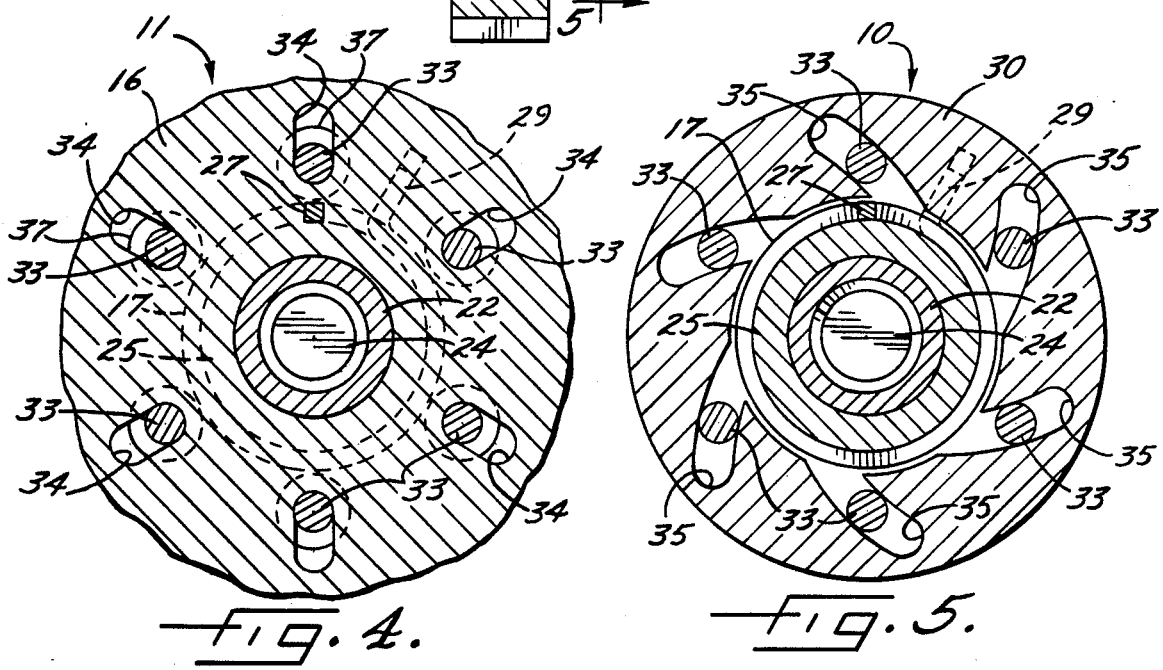

4,673,073

1

CENTRIFUGAL SPRING CLUTCH

CROSS-REFERENCE TO A RELATED APPLICATION

This application is a continuation-in-part of my application Ser. No. 628,205, filed July 5, 1984 and now abandoned.

BACKGROUND OF THE INVENTION

This invention relates to a centrifugal clutch in which the clutch is either engaged or disengaged by centrifugal action when the speed of rotation of one of the clutch members reaches a predetermined magnitude. The invention has more particular reference to a wrap spring clutch in which a helical spring wraps down against coaxial cylindrical clutch surfaces on input and output hubs to couple the latter for rotation together. One end of the spring is anchored on one of the hubs and the other end is secured to a control collar which is concentric with the clutch surfaces. In a normally engaged clutch, turning of the control collar relative to the hubs causes the spring to unwrap from the clutch surfaces and free the hubs to rotate independently of each other. In a normally disengaged clutch, turning of the control collar relative to the hubs causes the spring to wrap down on the hubs to couple the hubs for rotation in unison.

SUMMARY OF THE INVENTION

The general object of the invention is to provide a novel clutch of the foregoing type in which the hub to which the spring is anchored is coupled to the control collar by a unique and comparatively simple connection which responds to the centrifugal force produced by the rotation of the hub and which operates to turn the collar relative to the hub thereby to unwrap the spring of a normally engaged clutch or to cause the spring of a normally disengaged clutch to wrap down.

A more detailed object is to form the connection by means of one or more pins extending longitudinally through slots in the hub and through slots in the collar with the slots in the collar extending outwardly in a direction different from that of the slots in the hub so that, as the pins move radially outwardly under centrifugal force, they turn the collar relative to the hub.

The invention also resides in the novel details of construction of the connection.

BRIEF DESCRIPTION OF THE DRAWINGS

FIG. 1 is a perspective view of a drive assembly using one embodiment of a clutch which incorporates the unique features of the present invention.

FIG. 2 is an enlarged sectional view taken along the line 2—2 in FIG. 1.

FIG. 3. is an enlarged perspective view of the helical spring.

FIG. 4 is a fragmentary sectional view taken along the line 4-4 in FIG. 2.

FIG. 5 is a sectional view taken along the line 5—5 in FIG. 2.

DETAILED DESCRIPTION OF THE PREFERRED EMBODIMENTS

Figure 6:
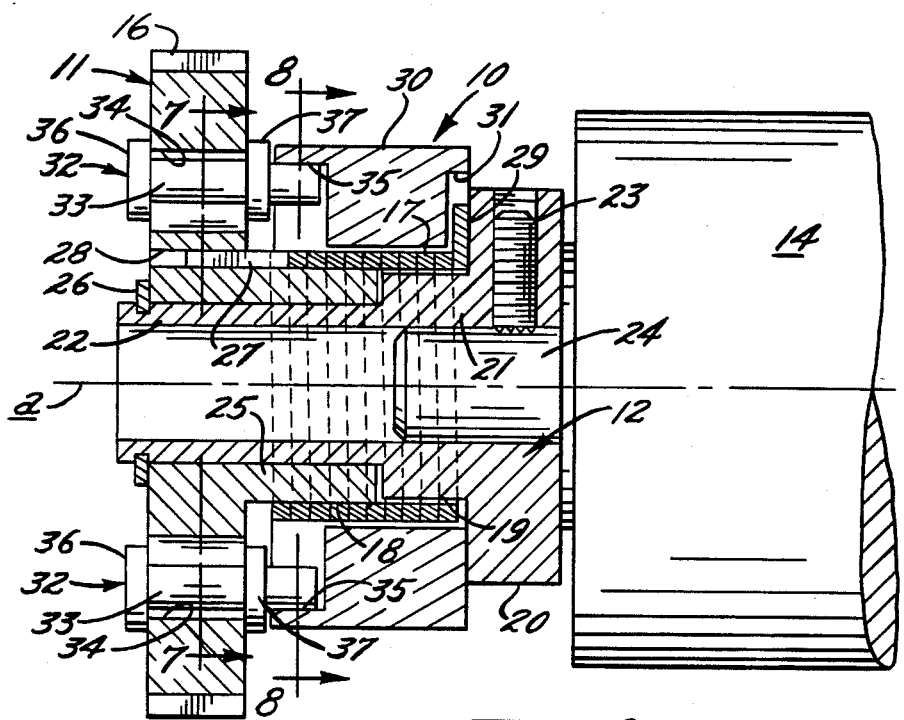
FIG. 6 is a sectional view similar to FIG. 2 but showing the parts in a moved position.

As shown in the drawings for purposes of illustration, the invention is embodied in a wrap spring clutch 10 for coupling a driving or input member 11 and a driven or output member 12 for rotation in unison and for selectively uncoupling the members to allow the rotation of either relative to the other. Although such a clutch has a wide variety of applications, it is shown herein as connecting a variable speed motor 13 to an output shaft 14 with a pinion 15 on the shaft of the motor driving a spur gear 16 on the input member. The input and output members are in the form of axially alined hubs respectively which rotate about the common axis a, the latter also being the axis of the output shaft, and a helical spring 17 is operable when wrapped against the hubs to couple the latter to rotate together.

While the invention is applicable to wrap spring clutches of various types, it is preferred to incorporate it in a clutch in which the spring 17 wraps down on external cylindrical surfaces 18 and 19 on the input and output hubs 11 and 12 in order to couple the hubs for rotation in unison. The specific embodiment which has been illustrated is a normally engaged clutch in which the output hub 12 is a cylindrical sleeve having a radial flange 20 at the end adjacent the output shaft 14, a body portion 21 defining the surface 19 and a reduced end portion 22 extending beyond the body portion. A set screw 23 is threaded radially through the flange 20 and bears against an axial stub 24 on the output shaft 14 to secure the hub 12 to the latter shaft. The input hub 11 also is a cylindrical sleeve having a body portion 25 journaled on the end portion 22 of the hub 12 and held in place by a snap ring 26 with the outer surface of the body portion constituting the clutch surface 18. The spur gear 16 is a radial flange formed as an integral part of the input hub at the outer end thereof. The cylindrical clutch surfaces 18 and 19 are disposed end to end and the convolutions of the spring 17 extend over both of these surfaces. The outer end of the spring is formed with a longitudinally extending tang 27 which projects into a hole 28 in the input hub so that the adjacent end of the spring turns with the hub. In this particular instance where the clutch is a normally engaged clutch, the spring is normally wrapped down upon the clutch surfaces to couple the input and output hubs. By turning a radial tang 29 on the inner end of the spring relative to the input hub in a direction to unwind the spring, the latter releases at least one of the clutch surfaces whereby the hubs are free to turn independently of each other. Such turning of the tang 29 is achieved by means of a control sleeve or collar 30 which surrounds the spring and receives the tang 29 in a radial slot 31. Thus, the tang is turned by turning the control collar relative to the input hub. In the present instance, the surface 21 is somewhat smaller in diameter than the surface 20 and, essentially, the spring releases only the surface 19 as illustrated in FIG. 6. If the diameters of the surfaces 20 and 21 were equal, the spring would release both surfaces when the spring unwinds.

The present invention contemplates the provision of a novel clutch 10 in which the spring 17 is either automatically released or is automatically wrapped down when one of the hubs 11 and 12, herein the input hub, reaches a predetermined speed of rotation. To this end, the clutch includes a connection 32 between the hub and the control collar 30 and the connection responds to a preselected increase in centrifugal force to turn the collar relative to the hub either in a direction to unwind the spring 17 and release the clutch or in a direction to cause the spring to wrap down and engage the clutch. More specifically, the connection 32 includes at least one elongated pin 33 which parallels the axis a and which projects into slots 34 and 35 in the hub and the collar respectively, the slots extending outwardly away from the axis a. The pin has a mass or weight substantial enough to move radially outwardly by centrifugal force when the hub reaches a predetermined speed of rotation and at least one of the slots extends non-radially, that is, spirally, so that the outward movement of the pin produces a camming action which turns the control collar relative to the hub in the appropriate direction to either release a normally engaged clutch or to engage a normally released clutch.

In the preferred embodiment of the normally engaged clutch 10 which has been illustrated, the release of the clutch 10 is responsive to the speed of the input hub 11 and, accordingly, the slot 34 is formed in this hub. Preferably, a plurality of pins 33, herein six, are employed with an equal number of slots 34 and 35 and are angularly spaced equally around the axis a. The slots 34 are formed in the gear or flange 16 of the input hub while the slots 35 are formed in the adjacent end of the control collar 30. The slots 34 extend radially from a point outwardly of the spring tang 27 and stop well short of the periphery of the gear while the slots 35 extend spirally in a counterclockwise direction as viewed in FIG. 5 from the inner periphery of the control collar to a point short of the outer periphery. A head 36 is formed on the outer end of each pin on the outside of the gear 16 and a radial flange 37 similar to the head is formed on the pin intermediate its ends and on the inside of the gear. The head and the flange are larger in diameter than the width of the slot 34 to captivate the pin in the slot and the head and the flange also add to the mass of the pin in producing the centrifugal action.

Figure 7:
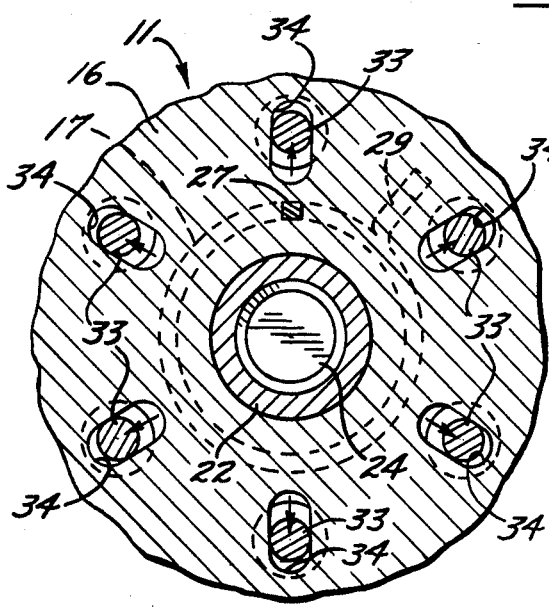
FIG. 7 is a sectional view taken along the line 7—7 in FIG. 6.
Figure 8:
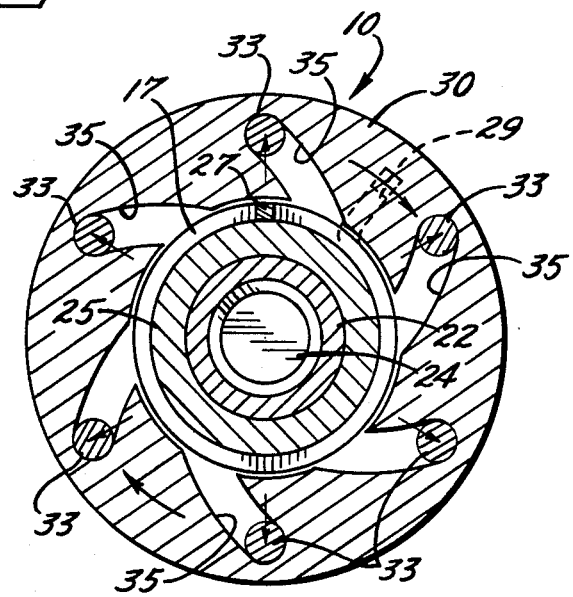
FIG. 8 is a sectional view taken along the line 8—8 in FIG. 6.

When the spring 17 is in its normally engaged condition wrapped tightly around the clutch surfaces 18 and 19, the inner ends of the slots 34 are alined with an inner portion of the corresponding slots 35 while the pins 33 are in their innermost position as illustrated in FIGS. 2, 4 and 5 of the drawings. In this condition of the parts, the hubs 11 and 12 are coupled by the spring so that the motor 13 drives the output shaft 14. In the illustrated form, the motor drives the hubs in a clockwise direction as indicated by the arrows in FIG. 1 and, as shown in FIG. 2, the spring has a left hand wind so that it is unwound away from the clutch surface 19 by moving the tang 29 in a clockwise direction. Thus, when the speed of the input hub reaches a magnitude preselected by the design of the parts, the pins 33 move radially outward in the slots 34 by centrifugal action as illustrated by the arrows 38 in FIGS. 7 and 8. Because of the spiral shape of the slots 35, the outward movement of the pins produces a camming action which advances the control collar 30 clockwise relative to the input hub as indicated by the arrows 39 in FIG. 8. As a result, the tang 29 also is moved clockwise of the tang 27 to unwind the spring and release the clutch surface 19. When the speed of the input hub falls below the preselected speed, the spring is effective to return the parts of the clutch to the clutch-engaging position.

When the invention is incorporated in a normally disengaged clutch, the spring 17 is normally wrapped down on the input hub 11 and is normally spaced radially from the output hub 12 (see, for example, the illustration of FIG. 6). As long as the input hub 11 is rotating below a given speed, the spring 17 and the control collar 30 turn in unison with the input hub, the spring rotating free of the output hub 18. When the speed of the input hub reaches a predetermined magnitude, the pins 33 move radially outwardly in the slots 34 by centrifugal action. The pins coact with the spiral-shaped slots 35 to produce a camming action which turns the control collar 30 relative to the input hub 11 in a direction to cause the spring 17 to wrap down on the output hub and engage the clutch. If, for example, the spring 17 has a right hand wind, the spring will wrap down on the output hub 12 when the collar 30 and the tang 29 are rotated in a clockwise direction from the position shown in FIG. 5 to the position shown in FIG. 8.

I claim:

1. A clutch having, in combination, input and output hubs rotatable about a common axis, a sleeve telescoped with and spaced radially from said hubs, a helical spring normally wound around the hubs in torque-transmitting engagement with said hubs whereby the input hub drives the output hub, one end of said spring being secured to said sleeve and the other end of said spring being secured to one of said hubs, and a connection between said one hub and said sleeve, said connection including a first slot in said one hub and extending outwardly away from said axis, a second slot in said sleeve and extending outwardly away from said axis, and a pin paralleling said axis and projecting through both of said slots, said pin having substantial mass to move radially outwardly in said slots by centrifugal action when said one hub rotates at a predetermined speed, one of the slots extending spirally relative to the other to turn said sleeve relative to said one hub in a direction to wind said spring away from said hubs and out of torque-transmitting engagement therewith when said pin moves outwardly in said slots.

2. A clutch as defined in claim 1 in which said first slot is formed in said input hub.

3. A clutch as defined in claim 2 in which said first slot extends radially outwardly and said second slot extends spirally outwardly.

4. A clutch as defined in claim 1 including a plurality of pins equally spaced angularly around said one hub and a plurality of first and second slots, there being one of each of said slots for each of said pins.

5. A clutch having, in combination, input and output hubs rotatable about a common axis, a sleeve telescoped over and radially spaced from said hubs, a helical spring disposed between said hubs and said sleeve and normally would down on the hubs in torque-transmitting engagement whereby the input hub drives the output hub, one end of said spring being secured to said sleeve and the other end of the spring being secured to said input hub, and a connection between said input hub and said sleeve, said connection including a plurality of first slots formed in and angularly spaced equally around said input hub and extending radially outwardly away from said axis, a plurality of second slots formed in and angularly spaced equally around said sleeve and extending spirally outwardly away from said axis, there being an equal number of first and second slots with the inner end of each of said first slots being alined with the inner end of the corresponding one of said second slots when said spring is wound down on said hubs, and a plurality of pins, one for each of said first slots and each projecting through the associated one of said first slots and the corresponding one of said second slots, said pins having substantial mass to move radially outwardly by centrifugal action when said input hub rotates at a predetermined speed and to turn said sleeve relative to the input hub thereby to wind said spring out of torque-transmitting engagement with said hubs.

6. A clutch having, in combination, input and contact hubs rotatable about a common axis, a sleeve telescoped with and spaced radially from said hubs, a helical spring adapted to be wound around the hubs in torque-transmitting engagement with said hubs to cause the input hub to drive the output hub, said spring being adapted to unwind to release said hubs for relative rotation, one end of said spring being secured to said sleeve and the other end of said spring being secured to one of said hubs, and a connection between said one hub and said sleeve, said connection including a first slot in said one hub and extending outwardly away from said axis, a second slot in said sleeve and extending outwardly away from said axis, and a pin paralleling said axis and projecting through both of said slots, said pin having substantial mass to move radially outwardly in said slots by centrifugal action when said one hub rotates at a predetermined speed, one of the slots extending spirally relative to the other to turn sdaid sleeve when said pin moves outwardly.

7. A clutch as defined in claim 6 in which said first slot is formed in said input hub.

8. A clutch as defined in claim 7 in which said first slot extends radially outwardly and said second slot extends spirally outwardly.

9. A clutch as defined in claim 6 including a plurality of pins equally spaced angularly around said one hub and a plurality of first and second slots, there being one of each of said slots for each of said pins.

10. A clutch having, in combination, input and output hubs rotatable about a common axis, a sleeve telescoped over and radially spaced from said hubs, a helical spring disposed between said hubs and said sleeve and adapted to be wound around the hubs in torque-transmitting engagement therewith to cause the input hub to drive the output hub, said spring being adapted to unwind to release the hubs for relative rotation, one end of said spring being secured to said sleeve and the other end of the spring being secured to said input hub, and a connection between said input hub and said sleeve, said connection including a plurality of first slots formed in and angularly spaced equally around said input hub and extending radially outwardly away from said axis, a plurality of second slots formed in and angularly spaced equally around said sleeve and extending spirally outwardly away from said axis, there being an equal number of first and second slots with each of said first slots having a portion alined with a portion of the corresponding one of said second slots, and a plurality of pins, one for each of said first slots and each projecting through the associated one of said first slots and the corresponding one of said second slots, said pins having substantial mass to move radially outwardly by centrifugal action when said input hub rotates at a predetermined speed and to turn said sleeve relative to the input hub.

* * * * *